United States Patent [19]
Inoue et al.

[11] Patent Number: 5,341,286
[45] Date of Patent: Aug. 23, 1994

[54] CURRENT DETECTING METHOD

[75] Inventors: Hiroyuki Inoue, Yawata; Mikio Hasegawa, Neyagawa, both of Japan

[73] Assignee: Matsushita Electric Industrial Co., Ltd., Osaka, Japan

[21] Appl. No.: 918,811

[22] Filed: Jul. 23, 1992

Related U.S. Application Data

[63] Continuation of Ser. No. 615,452, Nov. 19, 1990, abandoned.

[30] Foreign Application Priority Data

Nov. 17, 1989 [JP] Japan ................................. 1-300445

[51] Int. Cl.⁵ .......................................... H02M 7/537
[52] U.S. Cl. ........................................ 363/98; 363/41; 363/132; 318/811
[58] Field of Search ...................... 363/41, 95, 98, 132; 318/802, 806, 811, 812; H02M 7/537

[56] References Cited
U.S. PATENT DOCUMENTS

| | | | |
|---|---|---|---|
| 3,569,805 | 3/1971 | Hammond | 318/811 |
| 4,377,779 | 3/1983 | Plunkett | 363/41 |
| 4,748,550 | 5/1988 | Okado | 363/98 |
| 4,772,996 | 9/1988 | Hanei et al. | 363/41 |
| 5,079,494 | 1/1992 | Reichard | 363/41 X |

*Primary Examiner*—Emanuel T. Voeltz
*Attorney, Agent, or Firm*—Wenderoth, Lind & Ponack

[57] ABSTRACT

A current detecting method in a case of effecting the digital current control of a motor by a PWM switching system, wherein the current feedback control time and the PWM period are synchronized, and the current for each of the current taking in PWM periods at a time established with respect to the reference signal for determining the PWM period is detected, so that the influence of the pulsation of the current by the PWM switching system may be reduced, and the performance improvement in the digital current feedback control may be improved.

6 Claims, 5 Drawing Sheets

CURRENT DETECTING METHOD

This application is a continuation of now abandoned application Ser. No. 07/615,452, filed Nov. 19, 1990.

BACKGROUND OF THE INVENTION

The present invention generally relates to a current detecting method in a case of effecting the digital current control of a motor or the like by a PWM (pulse width modulation) switching system.

Since a driving control circuit of a motor using a PWM switching system employing a transistor switch is superior in power saving and is small in size, it is used in many cases in recent years. But the PWM switching system has a disadvantage in that the current waveform form pulsates by the time constant or the like of the winding, because the PWM switching system is fundamentally based on an ON - OFF control. Through higher speed of the microprocessor, the digital control which was conventionally used for the positional loop, is now considered to be of practical use for the current loop. The construction of the conventional digital current control is shown in FIG. 6.

The operation will be described hereinafter with reference to FIG. 6. In the micro-processor 11, the current value of the motor 16 is detected by the current detecting circuit 13 for each of the sampling timings generated by the sampling timing generating circuit 12 to compare the current value with the current command at this time for outputting to the PWM switching circuit 14 a PWM ratio proportional to the difference. In the PWM switching circuit 14, the voltage supplied to the motor 16 is controlled in accordance with the PWM ratio and the PWM period generated by the PWM period reference signal generating circuit 15 so as to effect the current control.

In the above described construction, however, the timing of the current sampling is asynchronous with the PWM period, with a problem that the feedback current detected is subjected to the influence of the pulsation by the PWM switching as shown in FIG. 7.

SUMMARY OF THE INVENTION

Accordingly, an essential object of the present invention is to provide a current detecting method which comprises a step of reducing the influence of the pulsation by the PWM switching as the current is taken in at the timing being calculated automatically in accordance with the PWM ratio by the above described construction.

Another important object of the present invention is to provide a current detecting method which comprises a step of effecting the correct current detection through the simple calculation by the average current through the PWM period.

In accomplishing these and other objects, a first current detecting method of the present invention comprises the step of making the current feedback control time synchronous to the PWM period so as to take in the current at a timing established with respect to the reference signal for determining the PWM synchronization for detecting the current for each of the taking in PWM periods.

Also, a second current detecting method of the present invention comprises the step of detecting a current taken in at an intermediate timing of the ON time in the PWM switching signal, a current taken in at the intermediate timing of the OFF time, and the average current for each of the PWM periods from the PWM ratio.

In the first invention, as the current is taken in at the established timing in accordance with the PWM ratio by the above described construction, the influence of the pulsation by the PWM switching may be reduced.

Also, in the second invention, as the time constant of the winding generally is considerably larger than the PWM period, the pulsation of the current may be made approximate to the straight line one. The currents I1 and I2 taken in at the intermediate timing of the ON, OFF time may be assumed as average values between the respective intervals. Therefore, $$A*I1+(1-A)*I2$$

where A the PWM ratio.

The equation shows the average current through the PWM period, and the correct current detection may be effected by the simple calculation.

BRIEF DESCRIPTION OF THE DRAWINGS

These and other objects and features of the present invention will become apparent from the following description taken in conjunction with the present embodiment thereof with reference to the accompanying drawings, in which.

DETAILED DESCRIPTION OF THE INVENTION

Figure 1:
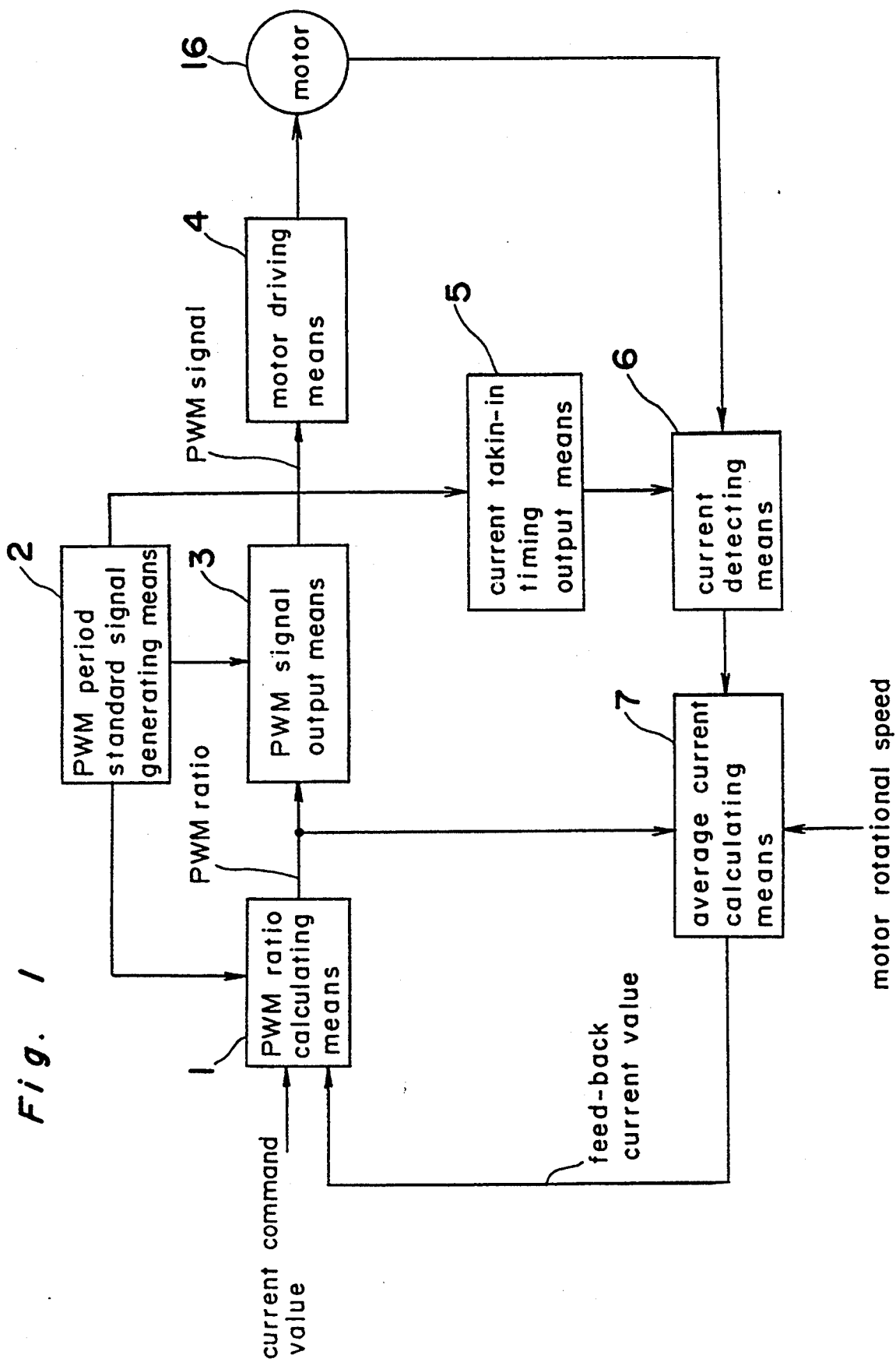
FIG. 1 is a block diagram in accordance with a first embodiment of the present invention.

Before the description of the present invention proceeds, it is to be noted that like parts are designated by like reference numerals throughout the accompanying drawings.

A current detecting method in accordance with the first embodiment of the present invention will be described hereinafter with reference to the drawings.

There is shown in FIG. 1, a block diagram of a current detecting method in accordance with the present embodiment, which includes a PWM ratio calculating means 1, a PWM period generating means 2 for generating the timing signals for each of the PWM periods, a PWM signal output means 3, a motor driving means 4, a current taking in timing output means 5, a current detecting means 6, an average current detecting means 7, and a motor 16.

Figure 2:
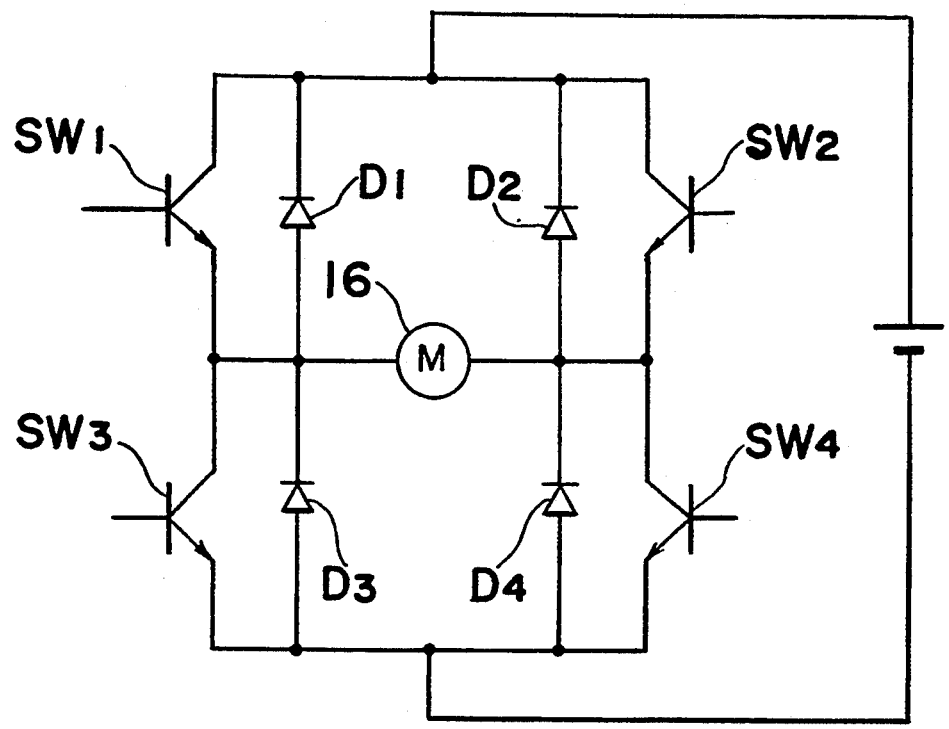
FIG. 2 is a motor driving circuit in the first embodiment.
Figure 3:
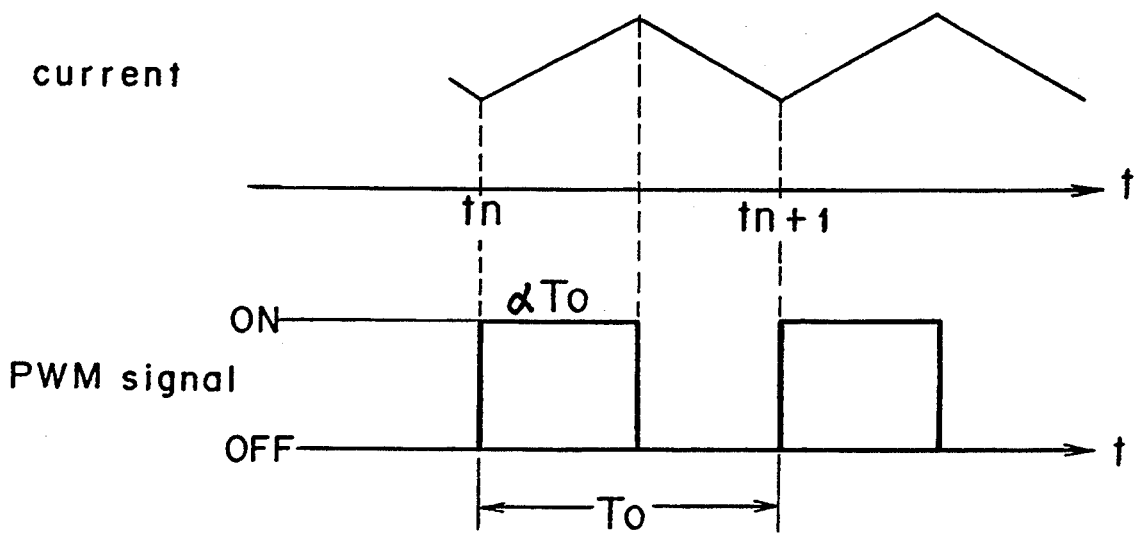
FIG. 3 shows the relationship between the PWM signal and the current waveform.

In the PWM ratio calculating means 1, a PWM ratio $\alpha$ is calculated in the next PWM period TO from a current command value Ic to flow during the next PWM period TO and a current feedback value If flowing to the motor 16. In the general feedback control, a proportional gain K is multiplied by the deviation of the Ic and If so as to calculate the PWM ratio $\alpha$. In the PWM signal output means 3, the next timing signal to be outputted from the PWM period generating means 2 is converted as a trigger into the PWM signal of TO time ON, (1−α) TO time OFF under the calculated PWM ratio α. Under the PWM signal, the motor 16 is driven by the motor driving means 4. The motor driving circuit which is the motor driving means 4 is shown in FIG. 2. In FIG. 2, the reference characters SW1 through SW4 are transistor switches. Reference characters D1 through D4 are free wheeling diodes. The current is turned on and off by a pair of switches SW1 and SW4 with the PWM signals. The current flowing to the motor 16 is turned on and off by a pair of switches SW2 and SW3. The relationship between the PWM signal and the current at this time is shown in FIG. 3.

The current detecting method of the present embodiment will be described in detail. The detection error is included when the PWM period and the current detection period are effected individually in an asynchronous manner, because the current is pulsating in the PWM switching system as shown in FIG. 3. Therefore, in the present method, the current taking in timing output means 5 is provided. The current taking in timing signal is outputted into the current detecting means 6 after the established time Td from the timing signal outputted from the PWM period generating means 2. In the present embodiment, a case with the setting time Td being made zero will be described. Assume that the current detected by the current detecting means 6 is (It) at the current taking in timing signal output, the average current Im at the PWM period TO is expressed by the following equation.

$$Im = \left[ \frac{V1}{R} \{\alpha TO + \tau(e^{-\alpha TO/\tau} - 1)\} - I1\tau(e^{-\alpha TO/\tau} - 1) + \frac{V2}{R} \{TO - \alpha TO + \tau(e^{-(1-\alpha)TO/\tau} - 1)\} - \left( \frac{V1}{R}(1 - e^{-\alpha TO/\tau}) + I1e^{-\alpha TO/\tau} \right) \tau(e^{-(1-\alpha)TO/\tau} - 1) \right]/TO \quad 1$$

$$V1 = VO - Ke.N \quad 2$$

$$V2 = -VO - Ke.N \quad 3$$

where
R; motor winding resistance
L; motor winding inductance
Ke; motor counter electromotive force constant
N; motor revolution number
VO; power voltage
τ; motor electric time constant (=L/R)

The above described calculation is effected by the average current calculating means 7 so as to transfer the calculation value Im as a feedback current value to the PWM ratio calculating means 1.

The current taking in timing output means 5 and the average current calculating means 7 synchronized with the PWM period are provided as described, so that the influences of the current pulsation may be reduced, and the average current during the PWM period may be obtained, so that the digital feedback control performance may be improved.

Here the DC motor has been described, and the same effect may be obtained even about the case of an AC motor.

Although the set means Td is made zero by the current taking in timing output means 5, TO−Td instead of TO may be used in one equation with Td being set within the range of Td<<TO, considering the influences of the switching noises.

The current detecting method in accordance with a second embodiment of the present invention will be described hereinafter with reference to the drawings.

Figure 4:
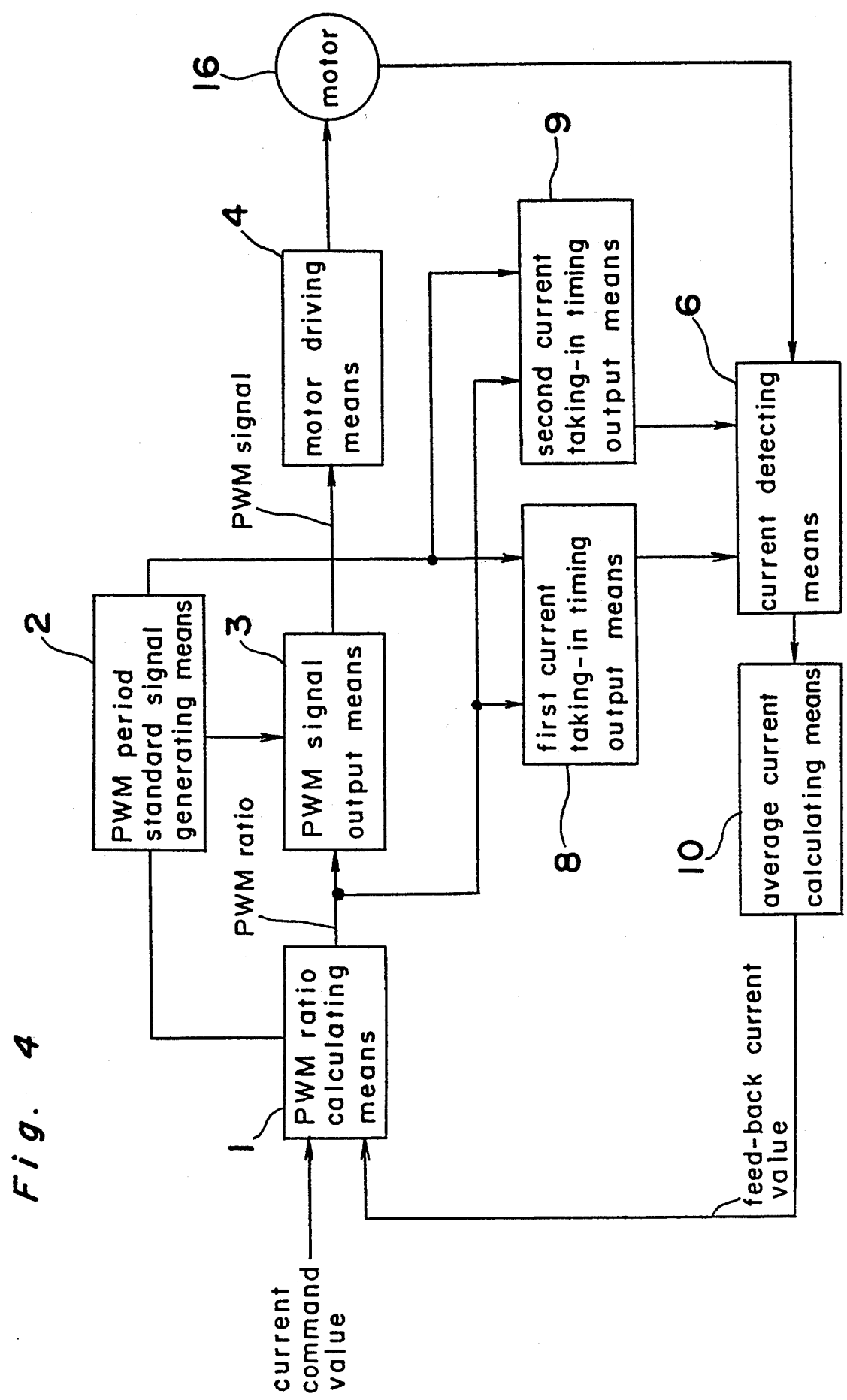
FIG. 4 is a block diagram in accordance with the second embodiment of the present invention.

FIG. 4 is a block diagram of the current detecting method in accordance with the present embodiment. In FIG. 4, element 8 is a fourth current taking in timing output means; element 9 is a second current 12 taking in timing output means; element 10 is an average current calculating means, and the others elements are the same as those of the whole block diagram of the first embodiment.

Figure 5:
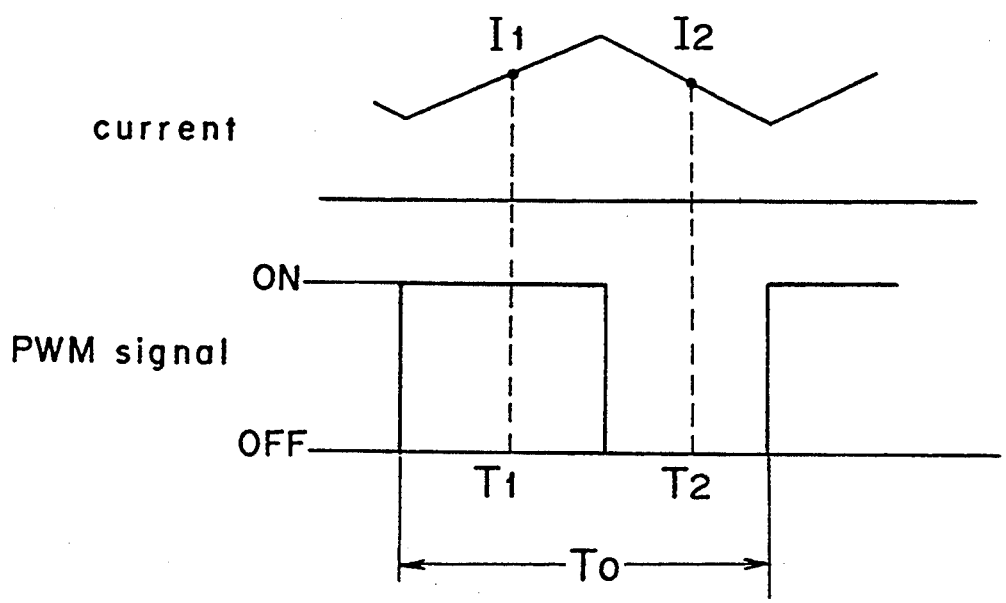
FIG. 5 shows the relationship of a PWM signal and a taking in current in the embodiment.
Figure 7:
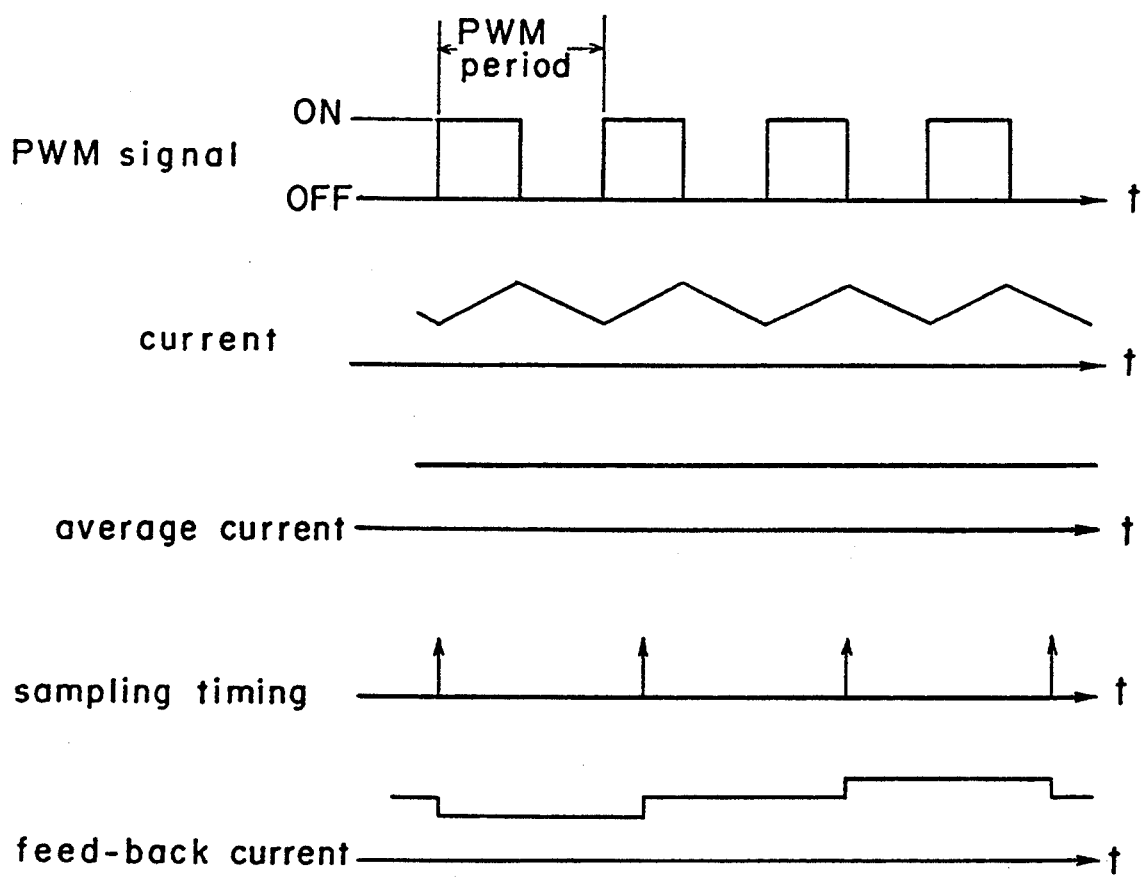
FIG. 7 shows the relationship between the PWM signal and the current waveform in the conventional digital control.
Figure 6:
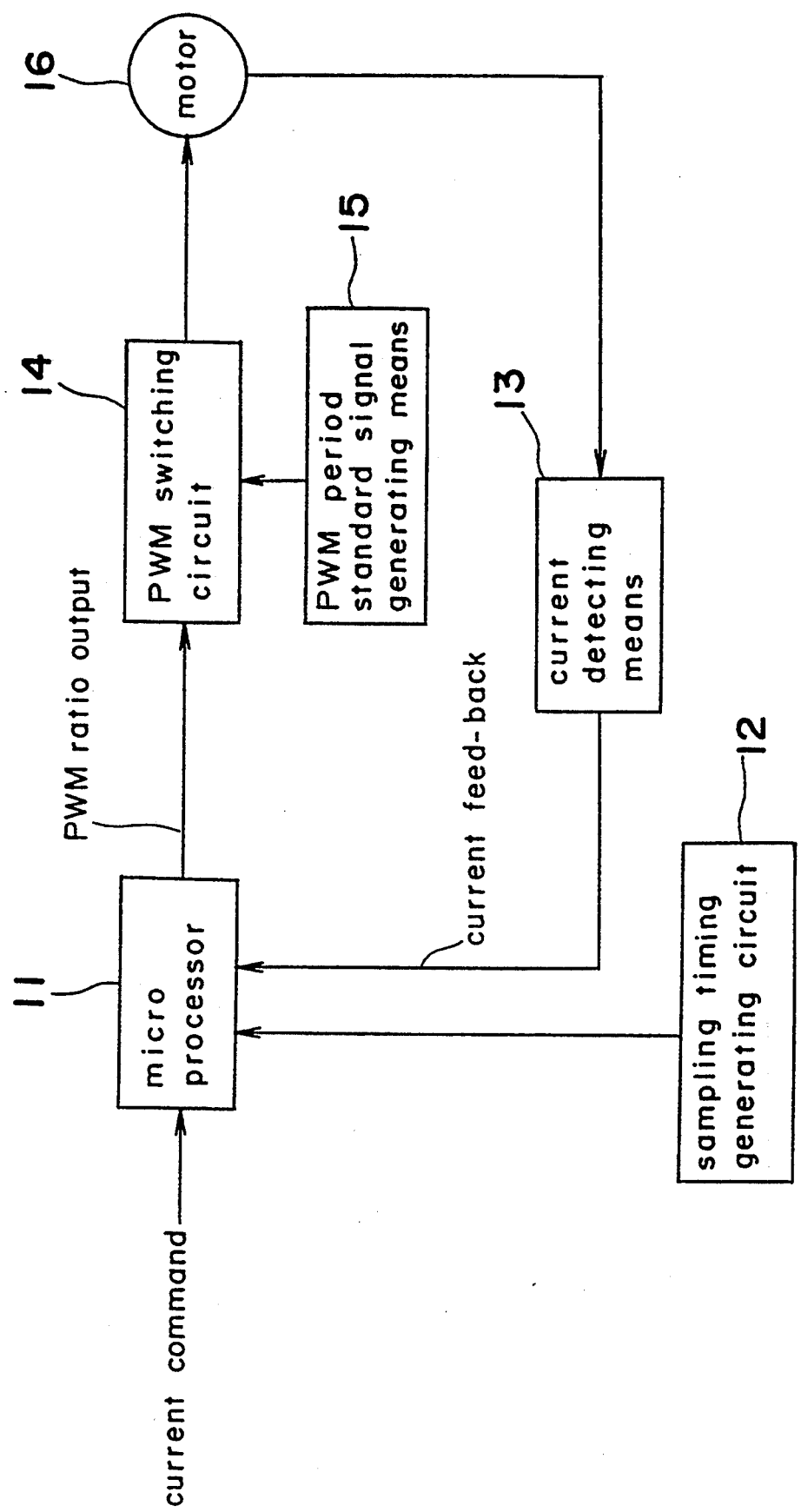
FIG. 6 is a block diagram of the conventional digital current control.

In the present current detecting method, two current taking in timing means 8 and 9 and the current 12 taking in timing output means are provided. The current taking in timing signal is outputted after times T1 and T2 time respectively with the timing signal to be outputted from the PWM period generating means 2 being provided as a trigger. The times T1 and T2 are calculated by the following equations.

$$T1 = \frac{\alpha TO}{2} \quad 4$$

$$T2 = \alpha TO + \frac{(1-\alpha)TO}{2} \quad 5$$

wherein α is PWM ratio, TO is PWM period. Namely, the time T1 is one half the time of the ON time of the PWM signal, while the time T2 is one half the time of the sum of the ON time and one half of the OFF time of the PWM signal. The relationship between the PWM signal and the current is shown in FIG. 5.

The electric time constant τ of the motor winding corresponding to the PWM period TO generally is made almost approximate to a short straight line in the current variation because of the TO established in the τ>>TO. Therefore, the current I1 taken in in the T1 by the first current taking in timing output means 8 and the current I2 taken in in the T2 by the second current taking in timing output means 9 may be regarded respectively as the average current of the ON time in the PWM period and the average current of the OFF time. In the average current calculating means 10, the average current Im is calculated by the following equation, and the value is sent as the feedback current value to the PWM ratio calculating means.

$$Im = \{\alpha TO.I1 + (1-\alpha) TO.I2\}/TO \quad 6$$

The currents I1 and I2 are taken in respectively by the intermediate timing of the PWM signal ON time and the intermediate timing of the OFF time through the synchronization with the PWM period as described hereinabove, so that the average current within the PWM period may be obtained by the simple calculation.

As is clear from the forgoing description, according to the first invention, the current feedback control time and the PWM period are synchronized, and the current for each of the current taking in PWM periods at a time established with respect to the reference signal for determining the PWM period is detected, so that the influence of the pulsation of the current by the PWM switching system may be reduced, and the performance improvement in the digital current feedback control may be improved.

In the second invention, the current taken in by the intermediate timing of the ON time in the PWM switching signal, the current taken in at the intermediate timing of the OFF time and the average current for each of the PWM periods from the PWM ratio may be detected, thus resulting in the large practical effect.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A motor current detection method comprising:
    driving a motor according to a periodic PWM signal having an ON time period and an OFF time period for each pulse thereof; and,
    detecting a motor current I of the motor from instantaneous current values I1 and I2 of the motor at respective intermediate time points of the ON and OFF time periods of the periodic PWM signal and from a duty factor $\alpha$ of the PWM signal.

2. A method as recited in claim 1, wherein the detected motor current I is determined in accordance with the following equation:

$$I = \alpha I1 + (1-\alpha)I2.$$

3. A motor control method comprising:
    driving a motor according to a periodic PWM signal having an ON time period and an OFF time period for each pulse thereof;
    detecting a motor current I of the motor from instantaneous current values I1 and I2 of the motor at respective intermediate time points of the ON and OFF time periods of the periodic PWM signal and from a duty factor $\alpha$ of the PWM signal; and
    controlling said driving of the motor according to the detected motor current I.

4. A method as recited in claim 3, wherein the detected motor current I is determined in accordance with the following equation:

$$I = \alpha I1 + (1-\alpha)I2.$$

5. A method as recited in claim 4, wherein said controlling step includes comparing a desired motor current with the detected motor current I, and adjusting the duty factor $\alpha$ of the PWM signal in accordance with the thus compared desired motor current and detected motor current I.

6. A motor control method comprising:
    a first step of repeatedly generating a periodic PWM signal having an ON time period and an OFF time period for each pulse period thereof and having a duty factor $\alpha$ which is set in accordance with a given current command value;
    a second step of driving a motor using the periodic PWM signal repeatedly generated in said first step;
    a third step of measuring instantaneous current values I1 and I2 of the motor at respective intermediate time points of the ON and OFF time periods of the periodic PWM signals, and calculating a detected motor current $I = \alpha I1 + (1-\alpha) I2$; and,
    a fourth step of controlling the motor by adjusting the duty factor $\alpha$ of the PWM signal repeatedly generated in said first step in accordance with a difference between the given current command value and the detected motor current I.

* * * * *